ated July 26, 1977

United States Patent [19]
Saffran

[11] 4,038,187
[45] July 26, 1977

[54] MICROSCREEN DRUM

[75] Inventor: Edward P. Saffran, Mukwonago, Wis.

[73] Assignee: Envirex Inc., Waukesha, Wis.

[21] Appl. No.: 654,811

[22] Filed: Feb. 3, 1976

[51] Int. Cl.$^2$ .......................................... B01D 33/06
[52] U.S. Cl. .................................. 210/108; 210/403; 210/404; 210/411; 210/499
[58] Field of Search ............... 210/402, 403, 404, 408, 210/409, 411, 393, 394, 82, 499, 108; 162/323, 357; 209/288, 294, 403

[56] References Cited

U.S. PATENT DOCUMENTS 3,773,614 11/1973 Pennington .................... 210/402 X

OTHER PUBLICATIONS

Bulletin No. 315-171, "Plus Performance Microscreens", copyright 1974, by Envirex Inc.

*Primary Examiner*—Frank W. Lutter
*Assistant Examiner*—William A. Cuchlinski, Jr.
*Attorney, Agent, or Firm*—Sughrue, Rothwell, Mion, Zinn and Macpeak

[57] ABSTRACT

The specification discloses an improvement in rotary drum screens for the filtration of liquids which comprise (a) a drum having a central horizontal axis and a radially outer surface, (b) a plurality of microscreen grids mounted on the radially outer surface of the drum, each of the microscreen grids comprising a screen which is divided into a large number of small cells by walls which extend radially with respect to the drum, (c) means for introducing the liquid to be filtered into the interior of the drum, (d) means for rotating the drum about its central axis, (e) a backwash header mounted outside the radially outer surface of the drum, and (f) a backwash receiving trough mounted within the drum for collecting filtrate accumulated on the screen. The liquid to be filtered is introduced into the drum at one end thereof, and the drum is supported so that it is partially submerged in the filtered liquid. The improvement resides in the fact that at least some of the walls which divide the microscreen grids into cells are at least generally parallel to the central axis of the drum and extend radially outwardly from the microscreen a distance sufficient so that, during use of the rotary drum screen to filter a given liquid, the said walls retain an amount of the liquid which just has time to drain through the microscreen between the time each cell emerges from the filtered liquid and the time it arrives underneath the backwash header.

8 Claims, 7 Drawing Figures

MICROSCREEN DRUM

FIELD OF THE INVENTION

This invention relates generally to rotary drum screens for the filtration of liquids such as are used in water treatment, sewage treatment, and industrial waste treatment. In particular, the invention relates to the microscreen grids which form the outer surface of such rotary screens.

THE PRIOR ART

Rotary drum screens of the type involved herein are well known in the art. The construction of such rotary screens may be easily understood with reference to FIGS. 1 and 3-5, although they depict a rotary drum screen incorporating the subject invention, and to FIG. 7 which shows the prior art. As shown herein, such screens comprise a drum 10 having a central axis 12 and a radially outer surface 14, a plurality of microscreen grids 16 mounted on the radially outer surface 14 of the drum 10, means 17 for introducing the liquid to be filtered into the interior of the drum 10, means 18 for rotating the drum 10 about its central axis 12, a backwash header 20 mounted above the radially outer surface of the drum 10, a backwash receiving trough 22 mounted within the drum 10 for collecting solids washed off the microscreen grids 16 by the backwash header 20, and means 24 for controlling the speed at which the means 18 rotate the drum 10 and/or for controlling the output of the backwash header 20 in response to the accumulation of solids on the microscreen grids 16.

The means 24 can, for instance, comprise an air supply 26 which supply air to two orifices 28 and 30, one of which is located within the drum 10 and the other of which is located without the drum 10, a differential pressure transmitter 32, a speed controller 34, an SCR controller 36, a variable speed motor 38, a backwash control 40, and a pump 42. With the rotary drum screen mounted in a tank 44 for use, the orifices 28 and 30 are located at the same distance above the bottom 46 of the tank 44. The height of the liquid above the bottom 46 of the tank 44 outside the drum 10 is kept constant by a weir 48 at the effluent end of the tank 44 the top of which is somewhat above the axis 12, as shown in FIG. 3, and the height of the liquid above the bottom 46 of the tank 44 inside the drum 10 is a function of the amount of filtrate accumulated on the microscreen grids 16. When the differential pressure transmitter 32 detects a pre-determined pressure differential, indicating a pre-determined height differential between the liquid inside and outside the drum 10, the speed controller 34 operates to increase the speed at which the variable speed motor 38 causes the drum 10 to rotate, thereby exposing each microscreen grid 16 to the backwash header 20 more frequently, the backwash control 40 operates to turn the backwash header 20 on (if it has been off) or to increase its output (if it has been on, but has a variable output), or both. The speed controller 34 and the backwash control 40 can be designed to be responsive to the same pressure differential or to different pressure differentials, and an alarm and/or a system shut-off can be provided responsive to a pressure differential in excess of that necessary to activate the speed controller 34 and the backwash control 40. Also, the speed controller 34 and the backwash control 40 can be designed to continue their operation, once activated, either for a set length of time or until a predetermined lower pressure differential has been obtained.

Each of the microscreen grids 16 comprises a screen which is divided into a large number of small cells by walls which extend radially inwardly from the surface of the microscreen. The microscreens themselves may be made from a large number of different commercially available screening materials. In the preferred rotary drum screens of the prior art, the walls are made from 20% glass filled polypropylene and form a square or rectangular grid one set of walls of which are parallel to the axis 12 of the drum 10 and the other set of walls of which are circumferential to the axis 12 of the drum 10. The radial extension of the walls is present to provide structural strength for the microscreen grids 16. The screen is attached to the walls when the latter are partially molten, and accordingly the walls pass through the screen and in some instances extend radially outwardly from the surface of the screen by a small amount (see FIG. 7). However, the radial outward extension of the walls is negligible in comparison to the radial outward extension of the walls which constitutes the present invention, described hereinafter.

The manner in which the microscreen grids 16 of the prior art are and the microscreen grids of the subject invention may be attached to the outer surface of the drum 10 is illustrated respectively in FIG. 7 and in FIGS. 4 and 5. While the microscreen grids 16 do not require frequent maintenance, it is occasionally necessary to remove them for repair or replacement. When it is necessary to remove the microscreen grids 16, it is obviously desirable that the replacement be accomplishable as rapidly as possible and without having to remove other microscreen grids which do not require repair or replacement. To this end, a plurality of channel beams 50 are provided parallel to the axis 12 and immediately beneath the radially outer surface of the drum 10, and the microscreen grids are provided with edge flanges 52. The channel beams 50 act both as supports for the microscreen grids 16 and as solids lifting blades which catch some of the solids that fall off the microscreens before they get over the backwash receiving trough 22. The microscreen grids 16 are bolted to the channel beams 50 by bolts 54, nuts 56, and washers 58 bearing against segmental clamping bars 60 as shown in FIG. 4, and the edges of the microscreen grids 16 perpendicular to the channel beams 50 are bolted to each other by bolts 62, nuts 64, and washers 66 bearing against segmented clamping bars 68 as shown in FIG. 5.

OBJECT OF THE INVENTION

It costs money to remove accumulated filtrate from microscreen grids 16 by increasing the speed of rotation of the drum 10 or turning on the backwash header 20 more frequently or more forcefully, and it is an object of this invention to decrease the frequency with which such corrective action must be taken without substantially increasing the cost of fabricating or operating the rotary drum screen.

DETAILED DESCRIPTION OF THE PRESENTLY PREFERRED EMBODIMENT

Figure 1:
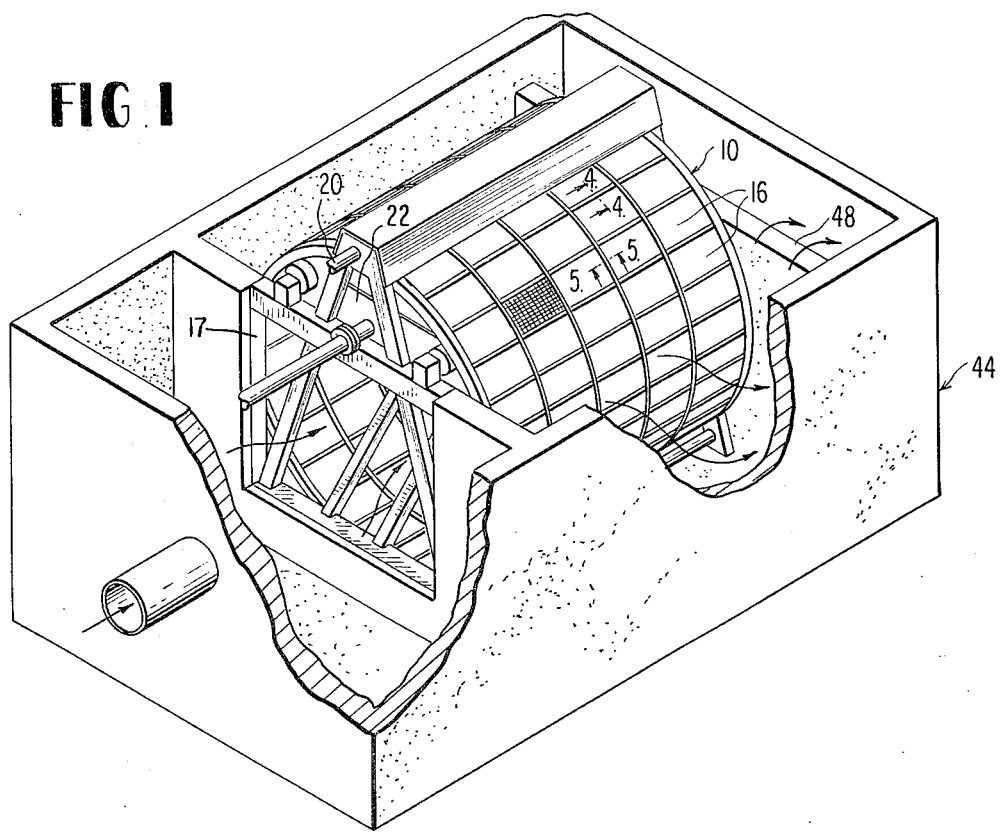
FIG. 1 is a perspective view of a rotary drum screen installation incorporating the subject invention.
Figure 2:
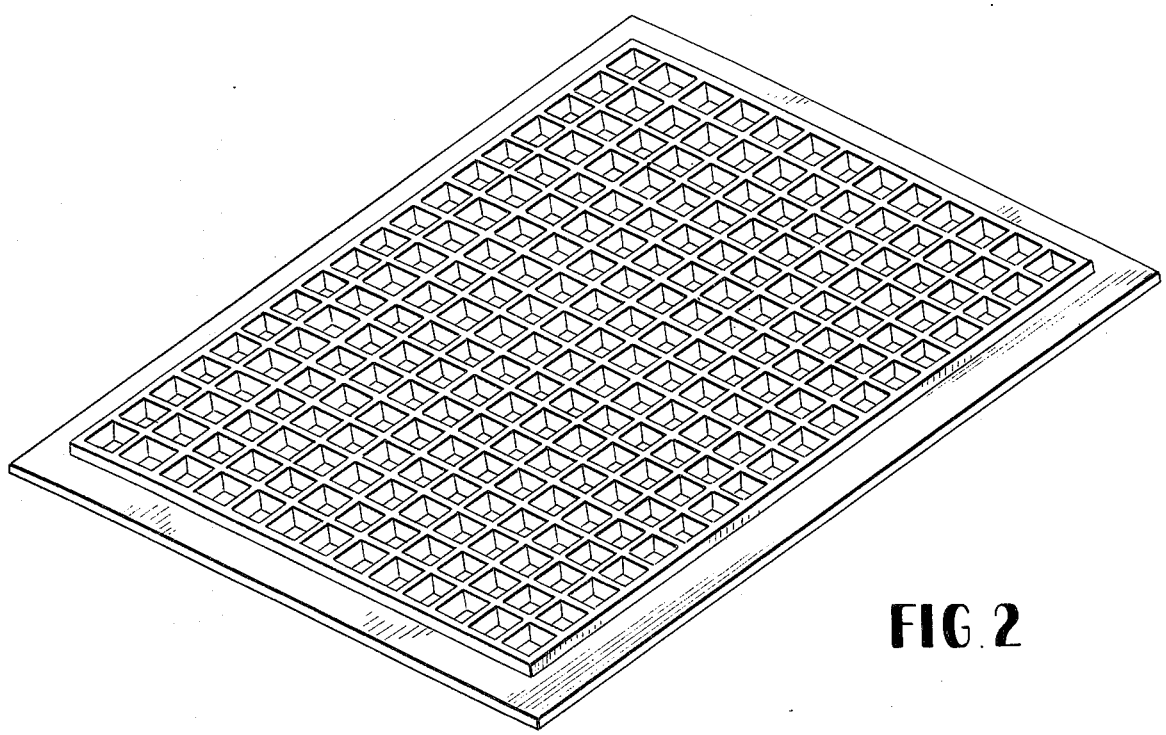
FIG. 2 is a perspective view of microscreen grid employed in the subject invention.
Figure 3:
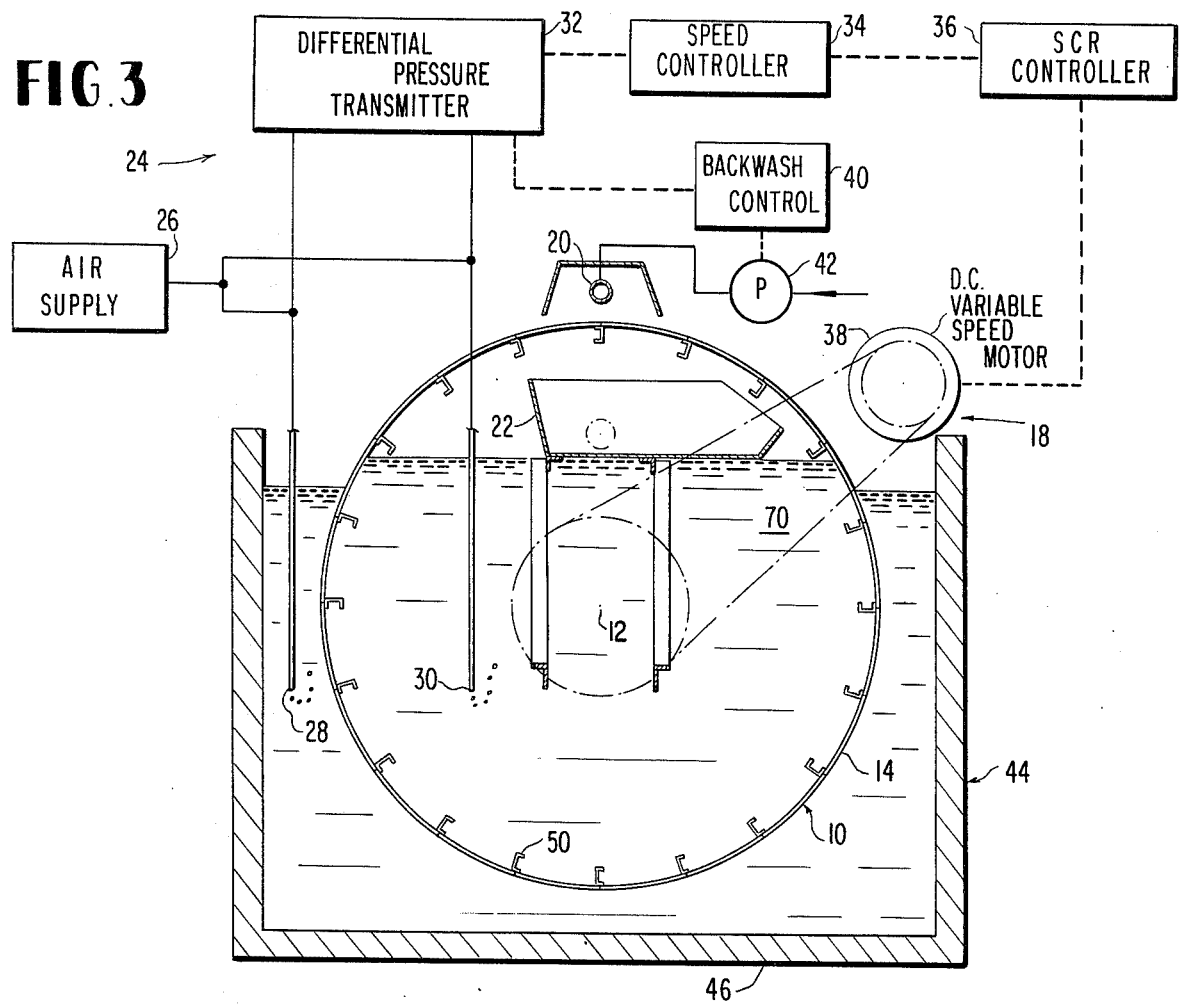
FIG. 3 is a cross-sectional view of the rotary drum screen shown in FIG. 1 with an exemplary control means for the principal backwash system shown in block diagram form.
Figure 4:
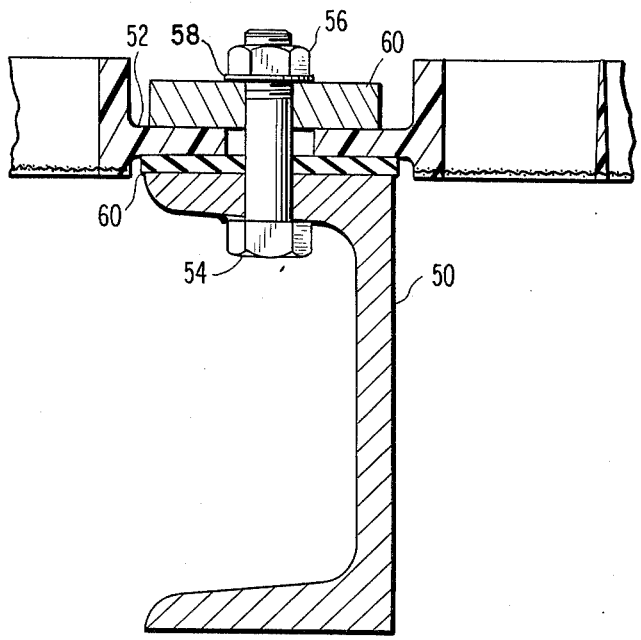
FIG. 4 is a fragmentary cross-sectional axial view showing how the microscreen grids may be mounted on the drum.
Figure 5:
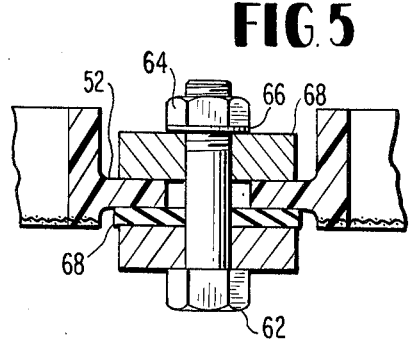
FIG. 5 is a fragmentary cross-sectional circumferential view showing how the microscreen grids may be connected to each other.

As shown in FIG. 2, the individual cells of the microscreen grids of the present invention have relatively high sides. While the appropriate height of the walls is a function of the liquid which is to be filtered, the amount and character of solids which is expected to accumulate on the microscreen before it is washed off by the backwash header, and the steady-state speed at which the rotary drum screen is rotated, to provide some guidance in the initial design of such a system it may be said that the assignee of the subject invention has found that, for a rotary drum screen which is to be used to filter a water supply or treated wastewater, which is to be rotated at a steady-state speed which is conventional for such devices, and which employs cells having square bottoms which are 1⅜ inches on a side, the area of the walls surrounding each section of the screen should be on the order of two times the area of the section, and preferably within the range of one and one half to three and one half times the area of the section.

As exemplary of manufacturing specifications for the subject invention, the following figures are provided;

Diameter of Drum: 10 feet (3.04 meters)
In-Flow: 120 ga./minute/axial foot; 24.8 liters/seconds/meter
Steady-state Rotational Speed: 60 feet/minute (1.9 rev./minute) (0.305 meters/second)
Backwash Flow: 0.6 gal./minute/axial foot (0.12 liters/second/meter)
Cell Base: 1 ⅜inches × 1 ⅜inches (3.38 cm × 3.38 cm)
Cell Wall Height: ⅝inch (1.58 cm)
Cell Volume: 1 1/9 in³ = 0.00481 gal. (18.12 cm - 18,12 ml)
Estimated Pick-up/Cell: 0.001 gal. (3.785 ml).

Figure 6:
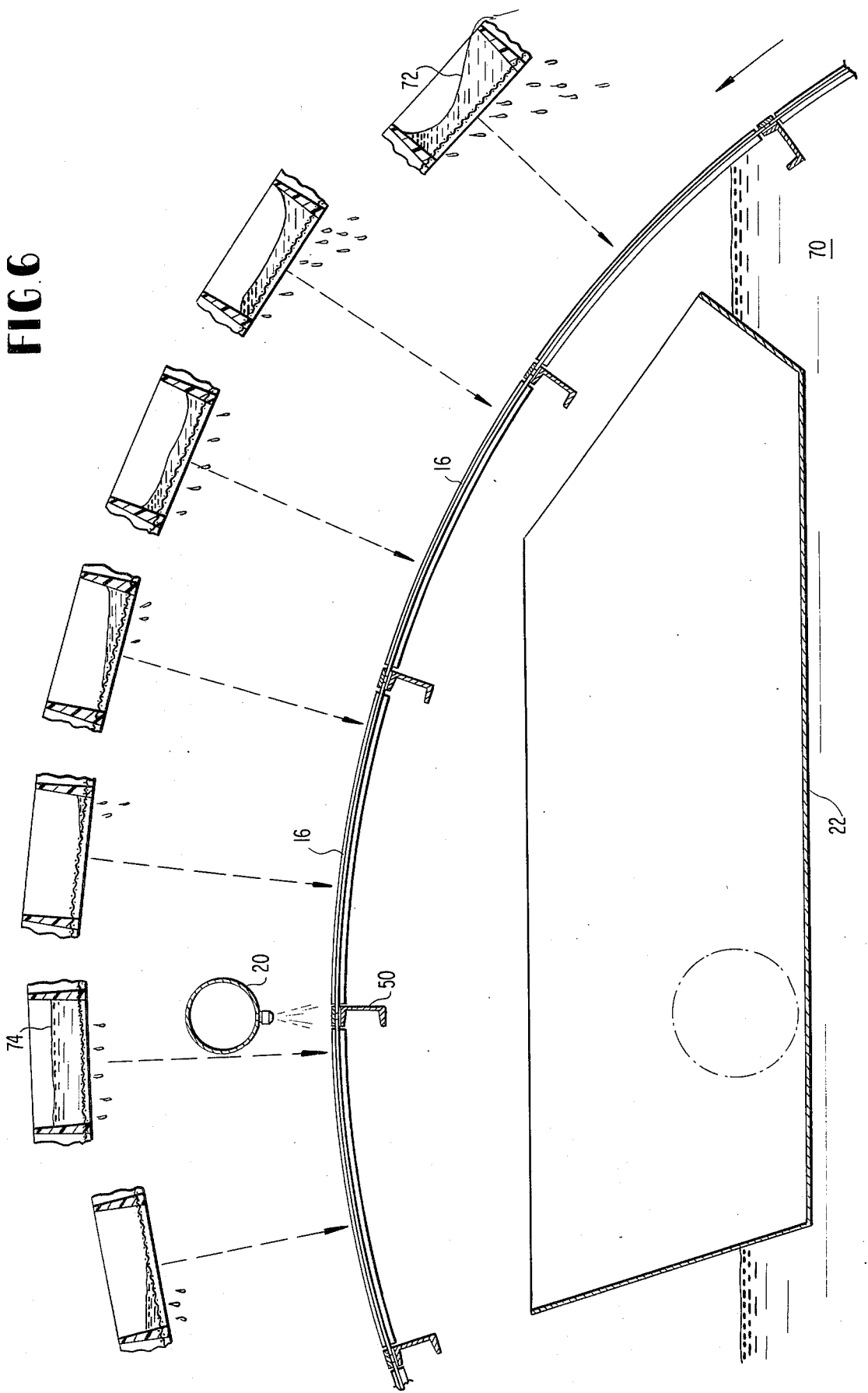
FIG. 6 is a fragmentary cross-sectional view of a portion of the rotary drum screen shown in FIG. 1 with greatly enlarged views of the individual cells of the microscreen grids showing the level of the liquid in the cells at various circumferential positions of the cells.

The way in which the subject invention works is illustrated in FIG. 6. When each cell emerges from the liquid 70, it is at an angle to the vertical, since, as previously stated, the liquid level is maintained above the axis 12 of the drum 10 by means of the weir 48. Thus, the cells would hold at least some liquid for a time even under static conditions. However, it has been found in practice that the cells in fact hold a good deal more liquid than is explainable in terms of purely static considerations, and it is believed that the additional liquid is held in the cell by adhesion between the higher axial wall of the cell and the liquid and that the surface of the liquid in the cell shortly after it emerges from the liquid 70 looks something like that shown at 72. Thereafter, the cell rotates closer and closer to the horizontal while the liquid entrained therein drains through the bottom of the microscreen, acting as a supplemental backwash system, until substantially all of the liquid has drained through the screen just before the cell gets under the backwash header 20. If the backwash header 20 is on, it then forces a backwash spray through the screen, further cleaning the microscreen and at least partially refilling the cell, as at 74. Thereafter, the liquid from the backwash header 20 also drains through the screen, presumably quite rapidly since substantially all the solids should have been removed from the microscreen by this time. For that reason, the backwash receiving trough 22 can be made substantially asymmetrical, as shown, since substantially all the liquid retained in the cells will have drained through the screen well before the cells re-enter the liquid 70 on the upstream side of the backwash header 20.

Figure 7:
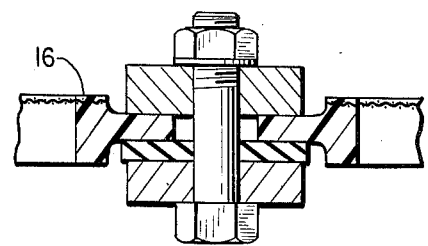
FIG. 7 is a view similar to FIG. 5 and shows the prior art described previously herein.

While it may appear that the microscreen grids 16 of the prior art have merely been "flipped over", far more than that is involved. Structurally, the backwash receiving trough must be revised so that the entrained ("free") backwash water is not merely returned to the feed within the drum; this revision then requires providing close control of the level of the feed so that it does not overflow the backwash receiving trough. Operationally, the drum must have a certain submergence in the filtered liquid and must operate within a given speed range so that the amount of water entrained by the microscreen grids is worthwhile. A speed which is too slow or too fast will not work. In regard to the possibility of "flipping over" the prior art grid of FIG. 7, such grids are too shallow to provide a worthwhile amount of entrained water under any practical conditions.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

What is claimed is:

1. In apparatus for screening a water supply or treated waste-water comprising a drum including 1) a cylindrical microscreen, 2) a rigid frame supporting said microscreen, and 3) end means for introduction of the water to be screened into the interior of said drum, a tank surrounding said drum to receive the screened water from said drum and including means for maintaining a selected level of screened water within said tank, bearing means rotatably supporting said drum on a horizontal axis below said water level, drive means rotating said drum at a selected speed of rotation, said microscreen having exposed upward and downward moving sections above said water level and an uppermost backwash section, a backwash water supply system having a discharge means directly over said backwash section and a backwash receiving trough within said drum immediately beneath said backwash section, the improvement wherein said rigid frame includes radially outwardly projecting intersecting walls forming a grid pattern overlaying and integrally connected to said microscreen, the cells of the grid pattern having a surface area of between one and one half and three and one half times the surface area of the microscreen underlying each cell, whereby the cells of said upward moving section entrain a substantial volume of screened water which flows through said microscreen by gravity and provides supplemental backwashing of said microscreen which allows the apparatus to operate at low flows without operation of said backwash water supply system.

2. Apparatus for screening a water supply or treated waste-water comprising a delivery channel, a tank having one wall provided with an inlet opening in communication with said channel and having an overflow outlet weir which establishes and maintains a given water level within the tank, a drum comprising a frame having one closed end and a microscreen surrounding same frame, bearings supporting said drum in said tank with the open end thereof in communication with said inlet opening and for rotation on a horizontal axis such that the top of said drum is above the maximum water level in said tank, a backwash water supply header immediately above the top of said drum, a backwash water receiving trough within said drum and immediately below said backwash water supply header, drive means operative to rotate said drum continuously in one direction on its axis, the upper lip of said trough being a selected distance above said outlet weir, control means which effectively limit the water level within said delivery channel and said drum to a range intermediate the level in said tank and the upper lip of said trough, said drum further including a grid surrounding and integrally connected to said microscreen and having circumferentially and axially extending walls projecting radially outwardly from said microscreen and dividing said microscreen into square or rectangular sections, the area of said walls surrounding each of said square or rectangular sections being in the order of two times the area of the section, said drive means being effective to rotate said drum with a peripheral velocity such that water passing through the upward moving microscreen sections between said levels is carried to the top of said drum and provides backwashing of said microscreen supplemental to that provided by said header.

3. The apparatus of claim 2 wherein said control means includes means controlling the backwash water supply to said header and the speed of rotation of said drum so that the level of the water to be screened within said drum is maintained within an optimum range which is generally midway between the maximum water level in said tank and the lip of said trough.

4. In a rotary drum screen for filtration of liquids, said rotary drum screen comprising:
 a. a drum having a central axis and a radially outer surface;
 b. a microscreen mounted on the radially outer surface of said drum, said microscreen being divided into a large number of small cells by walls which are integrally connected to said microscreen and which are integrally connected to said miroscreen and which extend radially from the surface of said microscreen;
 c. means for introducing the liquid to be filtered into the interior of said drum;
 d. means for rotating said drum about its central axis;
 e. a backwash header mounted above the radially outer surface of said drum; and
 f. a backwash receiving trough mounted within said drum for collecting the solids removed from the filtrate and accumulated on said microscreen; the improvement wherein a first plurality of the walls which divide said microscreen into cells extend radially outwardly from the microscreen in a direction such that and by a distance sufficient so that, during use of the rotary drum screen to filter a given liquid, the said first plurality of the walls retain an amount of the liquid at least approximately equal to the amount which would just have time to drain through said microscreen between the time each cell emerges from the liquid and the time it arrives underneath said backwash header.

5. A rotary drum screen for filtration of liquids as recited in claim 4 wherein a second plurality of the walls which divide said microscreen into cells are at least generally circumferential to the central axis of said drum and extend radially outwardly from said microscreen.

6. A rotary drum screen for filtration of liquids as recited in claim 4 wherein said first plurality of the walls which divide said microscreen into cells are at least generally parallel to the central axis of said drum.

7. A rotary drum screen for filtration of liquids as recited in claim 6 wherein a second plurality of the walls which divide said microscreen into cells are at least generally circumferential to the central axis of said drum and extend radially outwardly from said microscreen.

8. A rotary drum screen for filtration of liquids as recited in claim 4 wherein said microscreen comprises a plurality of screen grids.

* * * * *

Disclaimer and Dedication

4,038,187.—*Edward P. Saffran,* Mukwonago, Wis. MICROSCREEN DRUM. Patent dated July 26, 1977. Disclaimer and Dedication filed Aug. 18, 1981, by the assignee, *Envirex, Inc.*

Hereby disclaims and dedicates to the Public the entire term of said patent.
[*Official Gazette January 26, 1982.*]